US008386414B2

(12) United States Patent
Bromenshenkel et al.

(10) Patent No.: US 8,386,414 B2
(45) Date of Patent: Feb. 26, 2013

(54) BROWSING WITHIN A VIRTUAL ENVIRONMENT TO DETERMINE WEB CONTENT OF INTEREST BASED ON INTERACTIONS WITH VIRTUAL OBJECTS

(75) Inventors: Derek L Bromenshenkel, Rochester, MN (US); Zachary A Garbow, Rochester, MN (US); Daniel L Hiebert, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 12/268,811

(22) Filed: Nov. 11, 2008

(65) Prior Publication Data

US 2010/0121810 A1    May 13, 2010

(51) Int. Cl.
*G06F 17/00* (2006.01)
*G06N 7/04* (2006.01)

(52) U.S. Cl. .......................................................... 706/54
(58) Field of Classification Search .......................... None
See application file for complete search history.

(56) References Cited

U.S. PATENT DOCUMENTS

| 2001/0034661 | A1* | 10/2001 | Ferreira ........................... 705/26 |
| 2002/0113809 | A1* | 8/2002 | Akazawa et al. .............. 345/706 |
| 2008/0082405 | A1 | 4/2008 | Martinez et al. |
| 2008/0288492 | A1 | 11/2008 | Gemmell et al. |
| 2009/0063983 | A1* | 3/2009 | Amidon et al. ................ 715/733 |
| 2009/0113349 | A1 | 4/2009 | Zohar et al. |
| 2010/0122182 | A1 | 5/2010 | Bromenshenkel et al. |
| 2010/0149093 | A1 | 6/2010 | Edwards |

OTHER PUBLICATIONS

US Patent Application entitled "Browsing Within a Virtual Environment to Determine Virtual Objects of Interest Based on Interactions With Web Content" by Derek L. Bromenshenkel et al., filed Nov. 11, 2008, U.S. Appl. No. 12/268,805.
IBM W3 News on Nov. 13, 2006, "Sam Palmisano enters the virtual world" http://w3.ibm.com/news/w3news/top_stories/2006/11/tandip_sl_china.html.
IBM W3 News on Dec. 8, 2006, "Virtual Worlds: Transforming the way IBM does business" http://w3.ibm.com/news/w3news/top_stories/2006/12/asean_sg_sl_jkshinterview.html.
IBM W3 News on Jan. 29, 2007, "Five innovations, five years" http://w3.ibm.com/news/w3news/top_stories/2007/01/chq_five_in_five.html.

* cited by examiner

*Primary Examiner* — Kakali Chaki
*Assistant Examiner* — Luis Sitiriche
(74) *Attorney, Agent, or Firm* — Patterson & Sheridan LLP

(57) ABSTRACT

Embodiments of the invention provide techniques for integrating web browsing with a three dimensional (3D) immersive environment. In one embodiment, characteristics describing a user's web browsing history may be used to identify objects that are of interest to the user. The objects of interest may be matched to objects included in a virtual environment. The virtual objects may then be presented to the user within an interface to the virtual environment. In another embodiment, characteristics of user interactions with virtual objects may be used to determine related web content. The related web content may be presented to the user in a web browser.

21 Claims, 5 Drawing Sheets

US 8,386,414 B2

BROWSING WITHIN A VIRTUAL ENVIRONMENT TO DETERMINE WEB CONTENT OF INTEREST BASED ON INTERACTIONS WITH VIRTUAL OBJECTS

BACKGROUND OF THE INVENTION

1. Field of the Invention

Embodiments of the invention relate to immersive virtual environments. More specifically, embodiments of the invention relate to integrating web browsing with an immersive virtual environment.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, but may also include real-time voice communication.

Virtual worlds may be persistent. A persistent world provides an immersive environment (e.g., a fantasy setting used as a setting for a role-playing game) that is generally always available, and world events happen continually, regardless of the presence of a given avatar. Thus, unlike more conventional online games or multi-user environments, the plots and events continue to develop even while some of the players are not playing their characters.

SUMMARY OF THE INVENTION

One embodiment of the invention provides a computer-implemented method, comprising: collecting data describing interactions between an avatar and virtual objects in a virtual environment, the avatar being manipulated by a user; characterizing a level of interest of the user in the virtual objects using the collected data; determining web content corresponding only to those virtual objects for which the level of interest exceeds a predetermined level; and providing the determined web content to a web browser in a browsing session external to the virtual environment.

Another embodiment of the invention provides a computer readable storage medium containing a program which, when executed, performs an operation. The operation comprises: collecting data describing interactions between an avatar and virtual objects in a virtual environment, the avatar being manipulated by a user; characterizing a level of interest of the user in the virtual objects using the collected data; determining web content corresponding only to those virtual objects for which the level of interest exceeds a predetermined level; and providing the determined web content to a web browser in a browsing session external to the virtual environment.

Yet another embodiment of the invention includes a system, comprising: a processor and a memory containing a program. When executed by the processor, the program is configured to perform an operation, comprising: collecting data describing interactions between an avatar and virtual objects in a virtual environment, the avatar being manipulated by a user; characterizing a level of interest of the user in the virtual objects using the collected data; determining web content corresponding only to those virtual objects for which the level of interest exceeds a predetermined level; and providing the determined web content to a web browser in a browsing session external to the virtual environment.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
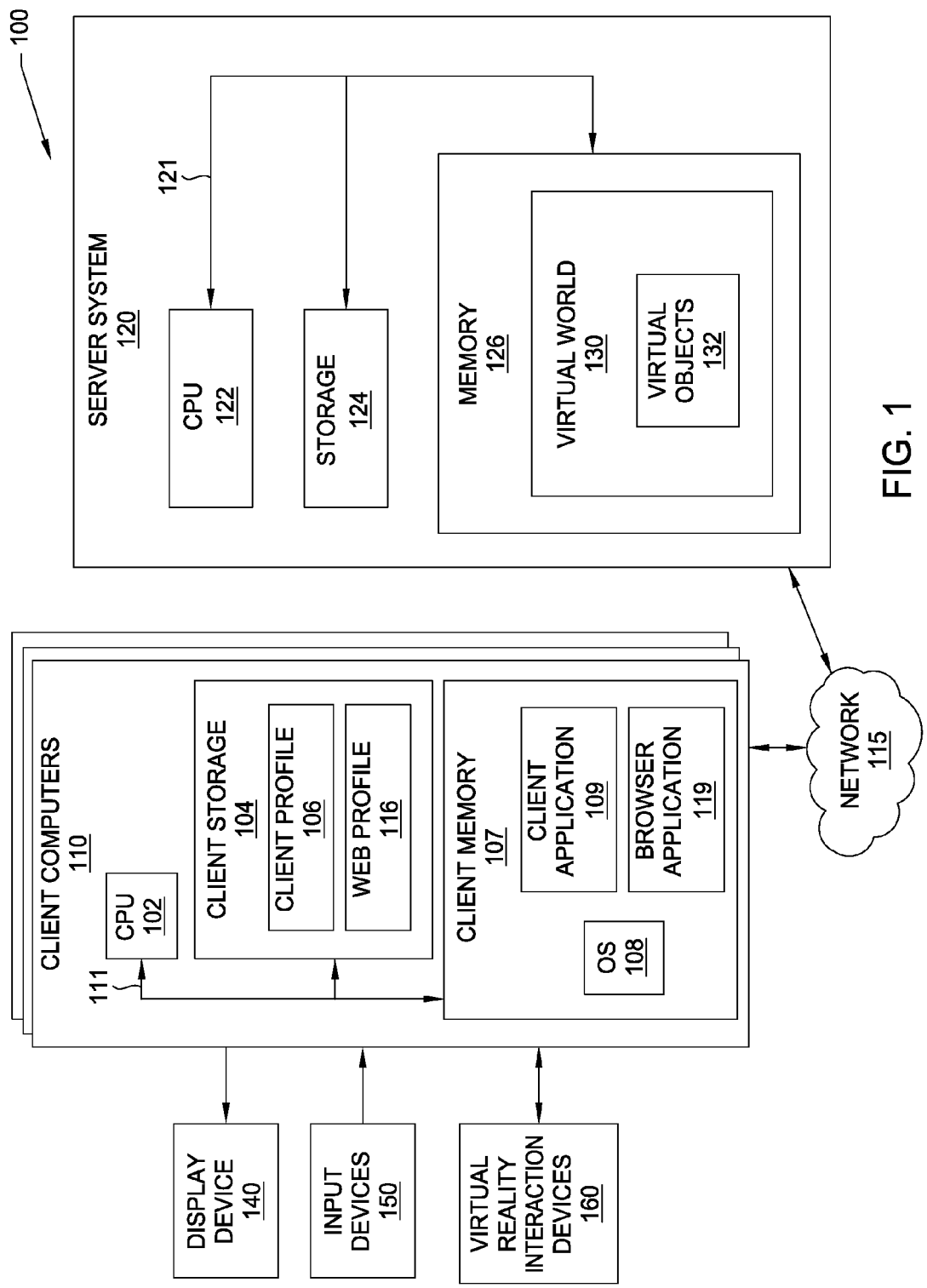
FIG. 1 is a block diagram that illustrates a client server view of computing environment, according to one embodiment of the invention.

In a web environment, a user may view and interact with web pages provided by web sites. The web pages may be rendered by a web browser, and may include content such as text, images, video, audio, etc. In a virtual environment, users inhabit a simulated environment, in which they may interact with one another via avatars. Further, users may interact with objects included of the virtual world. Such virtual objects may represent objects found in the real world, such as a car, a house, a tree, etc.

Embodiments of the invention provide techniques for integrating web browsing with an immersive environment (e.g., a three dimensional (3D) environment). In one embodiment, characteristics describing a user's web browsing history may be used to identify objects that are of interest to the user. The objects of interest may be matched to objects included in a virtual environment. The virtual objects may then be presented to the user within an interface to the virtual environment. In another embodiment, characteristics of user interactions with virtual objects may be used to determine related web content. The related web content may be presented to the user in a web browser.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). Storage 124 includes hard-disk drives, flash memory devices, optical media and the like. In addition, memory 126 and storage 124 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

Memory 126 includes virtual world 130. In one embodiment, virtual world 130 may be a software application that allows a user to explore and interact with an immersive virtual environment. Illustratively, virtual world 130 includes virtual objects 132. Virtual objects 132 represent objects represented within virtual world 130. Using the example illustrated in FIG. 2, virtual objects 132 may include box 250, store 220, etc.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 may be connected to the network 115.

Client memory 107 includes an operating system (OS) 108, a client application 109 and a browser application 119. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, browser application 119 provides a software program that allows a user to view and interact with web pages provided over the network 115 (e.g., the Internet). For example, browser application 119 may enable a user to view web pages provided by an Internet vendor, which may include content such as product descriptions, customer reviews and order processing content.

In one embodiment, client application 109 provides a software program that allows a user to connect to a virtual world 130, and once connected, to explore and interact with virtual world 130. Further, client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to virtual world 130 on server 120. Such a display may include content from the virtual world determined from the user's line of sight at any given time. For the user, the display may include the avatar of that user or may be a camera eye where the user sees the virtual world through the eyes of the avatar representing this user.

Figure 2:
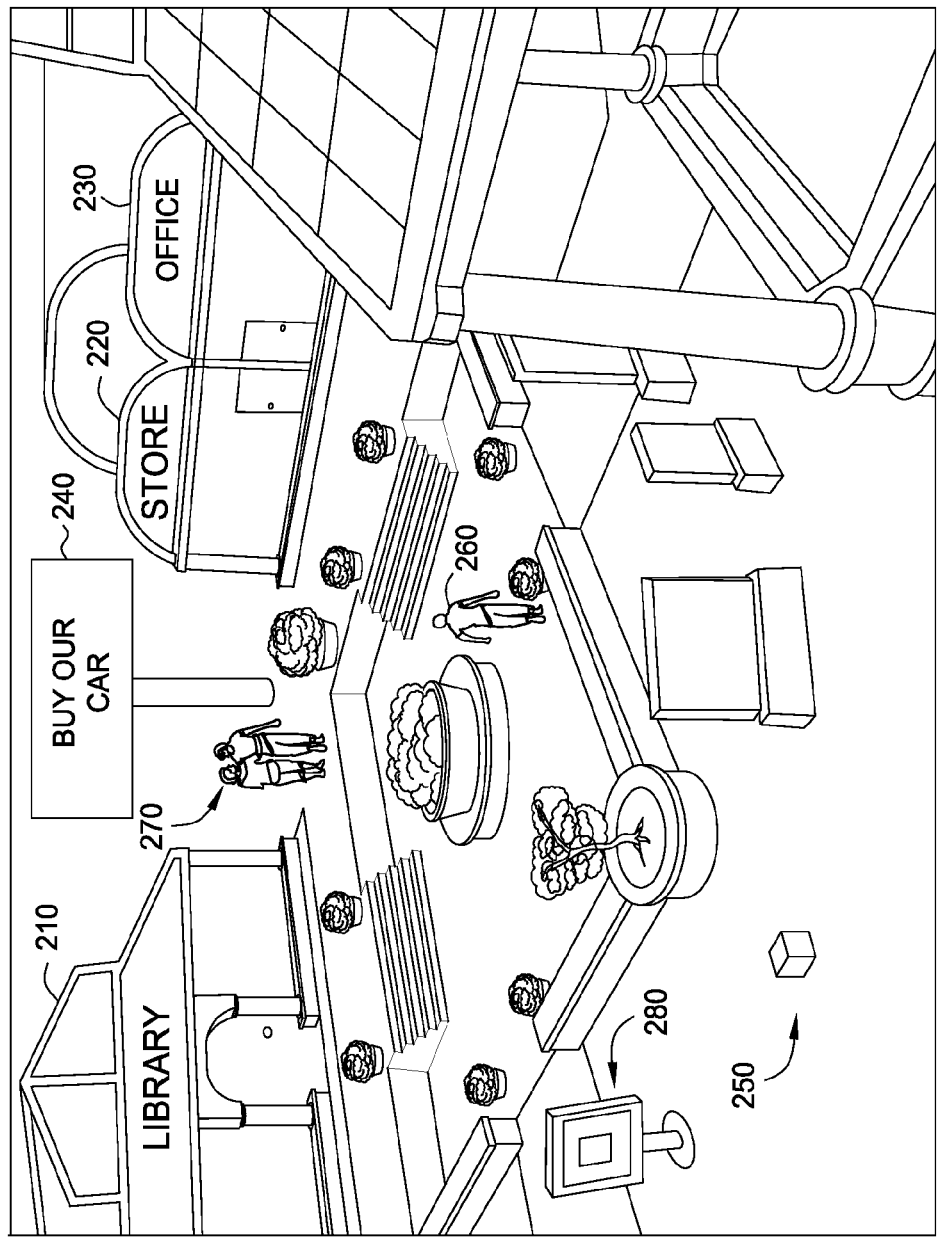
FIG. 2 illustrates a user display for a user participating in a virtual world, according to one embodiment of the invention.

For instance, using the example illustrated in FIG. 2, virtual objects 132 may include box 250, store 220, library 210, etc. More specifically, FIG. 2 illustrates a user display 200 for a user participating in a virtual world, according to one embodiment of the invention. In this example, the user is represented by avatar 260, and other users are represented by other avatars 270. The user may interact with elements displayed in user display 200. For example, the user may interact with a box 250 by picking it up, opening it, etc. The user may also interact with a kiosk 280 by operating controls built into the kiosk 280, requesting information, etc. The user may also interact with a billboard 240 by looking at it (i.e., by positioning the line of sight directly towards the billboard 240). Additionally, a user may interact with larger elements of the virtual world. For example, the user may be able to enter a store 220, an office 230, or a library 210. As used herein, the term "virtual objects" refers broadly to such elements of a virtual world (e.g., box 250, store 220, etc.).

The user may view the virtual world using a display device 140, such as an LCD or CRT monitor display, and interact with the client application 109 using input devices 150. Further, in one embodiment, the user may interact with client application 109 and virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within virtual world 130.

Within virtual world 130, avatars can interact with other avatars. For example, a user with avatar A could click on an avatar B to start an instant message conversation with the user associated with avatar B. Additionally, a user may interact with virtual objects 132. For example, the user may click on a building within the virtual world labeled as a store (e.g., store 220 shown in FIG. 2). In response, the client application 109 could cause the avatar representing the user to walk to the store, enter a lobby area and present the user with the interior of the store, including a virtual salesmen avatar, virtual products, and other avatars present in the store within virtual world 130. The user may then further interact with virtual objects 132 inside the store, for instance looking at a virtual product, picking it up, and purchasing it. The product may represent items used within the virtual environment, e.g., clothing worn by the avatar, or virtual real estate within the virtual world 130, but may also represent real-world goods or services purchased from within the virtual world 130.

In one embodiment, client storage 104 may store a client profile 106 and a web profile 116. Client profile 106 may be a data structure describing a user's interactions with virtual objects 132 while using client application 109. For example, client profile 106 may include a plurality of interaction records, each describing any virtual objects 132 that the user interacted with in virtual world 130. Each record may be based on descriptive data (e.g., keywords, metadata, object properties, etc.) related to the virtual object 132, and may be provided by client application 109. Further, each interaction record may include characteristics of the user interaction itself (e.g., type of interaction, date/time, duration, etc.) Such characteristics may be used to determine how much the user interacted with a virtual object 132, and thus to determine how much interest the user has in that particular virtual object 132. For example, a virtual object 132 that the user has devoted a great deal of attention to (e.g., carried, used, operated, looked at closely and for an extend periods of time, etc.) may be determined to be of more interest to the user than an object which the user looked at briefly while "walking" through a virtual room. Further, the records included in the client profile 106 may describe a virtual object 132 that has been explicitly designated by the user as an object of interest. For example, while in the virtual world 130, the user may perform a command indicating that a particular virtual object 132 is an object of interest.

In one embodiment, web profile 116 may be a data structure including data describing the user's web browsing and search history in browser application 119. For example, web profile 116 may include a plurality of records, each storing data describing the content of any web pages viewed by the user, as well as data describing the web sites hosting the web pages. Further, each record may describe web searches performed by the user, web bookmarks created by the user, web "cookies" received by browser application 119, and the like. A method of generating web profile 116 is discussed below with reference to FIG. 3, according to one embodiment.

In one embodiment, client application 109 may be configured to present users with virtual objects 132 based on an analysis of web profile 116. Client application 109 may analyze web profile 116 to determine objects of interest based on web content (e.g., web pages, web sites, discussion boards, blogs, etc.) that the user has viewed in browser application 119. As used herein, objects of interest may include goods, services, topics of discussion, etc. The user of client application 109 may then be presented with virtual objects 132 that match the objects of interest to the user. Virtual objects 132 may include, for example, a virtual representation of a car that the user has read about in browser application 119, a virtual store (e.g., virtual store 220 shown in FIG. 2) selling goods or services that the user has searched for in browser application 119, and the like. Optionally, objects of interest may be determined by evaluating whether the user's interest exceeds a predefined level of interest (e.g., the user viewed at least two web sites related to a given object in the user's last web browsing session, etc.).

In one embodiment, matching virtual objects 132 may be presented to the user immediately in response to a command performed in browser application 119. For example, upon viewing web content related to a particular car model, the user may select a button in a toolbar provided by a plug-in included in browser application 119. In response, client application 109 may be initiated, and may present the user with a virtual representation of the car. Alternatively, matching virtual objects 132 may be presented in the next instance that the user initiates client application 109 in order to view the virtual world 130.

In one embodiment, a matching virtual object 132 may be presented by "teleporting" the user to the object's location within virtual world 130. That is, the user moves instantaneously to location of the virtual object 132, without having to experience any simulated travel (e.g., walking, running, flying, etc.) from a previous location of virtual world 130. In the event of multiple matching virtual objects 132, client application 109 may present the matching virtual objects 132 in list form (e.g., a list of object names, a list of object images, etc.). In such a list, clicking on an object name or image may cause the user to be teleported to the location of the corresponding virtual object 132. Further, the list may be sorted according to how closely each virtual object 132 matches the user's web profile 116. Alternatively, client application 109 may present multiple matching virtual objects 132 in map form (e.g., a map of virtual world 130 including visual markers indicating the locations of matching virtual objects 132.).

In one embodiment, client application 109 may be configured to present a user with web content based on client profile 106. More specifically, client application 109 may initiate browser application 119 in order to display web content (e.g., web sites, search results, etc.) related to virtual objects 132 that the user has interacted with in client application 109. Such related web content may include, for example, a web site hosting a discussion board for users of a particular location in virtual world 130, a web store selling a particular object that the user viewed as a virtual object 132 within virtual world 130 (i.e., an object viewed using client application 119), and the like. The related web content may be presented immediately in response to a user command performed in client application 109. For example, upon interacting with a virtual representation of a car in virtual world 130, the user may perform a command to view web content related to the car. In response, browser application 119 may be instantiated as a stand-alone application (i.e., separate from the client application 109), and may present the user with a web page including performance data for the real world version of the car. Alternatively, the related web content may be presented in the next instance that the user initiates the browser application 119.

Of course, the embodiments described above are intended to be illustrative, and are not limiting of the invention. Other embodiments are broadly contemplated. For example, client profile 106 and web profile 116 may be stored on server 120, rather than on client computer 110. In another example, the functionality of client application 109 may be incorporated into a server-side application, such as an application hosting the virtual world 130, or in a separate application (e.g., browser application 119). In yet another example, client profile 106 and web profile 116 may be combined in a single data structure. In yet another example, the functionality of the browser application 119 may be incorporated into the client application 109.

Figure 3:
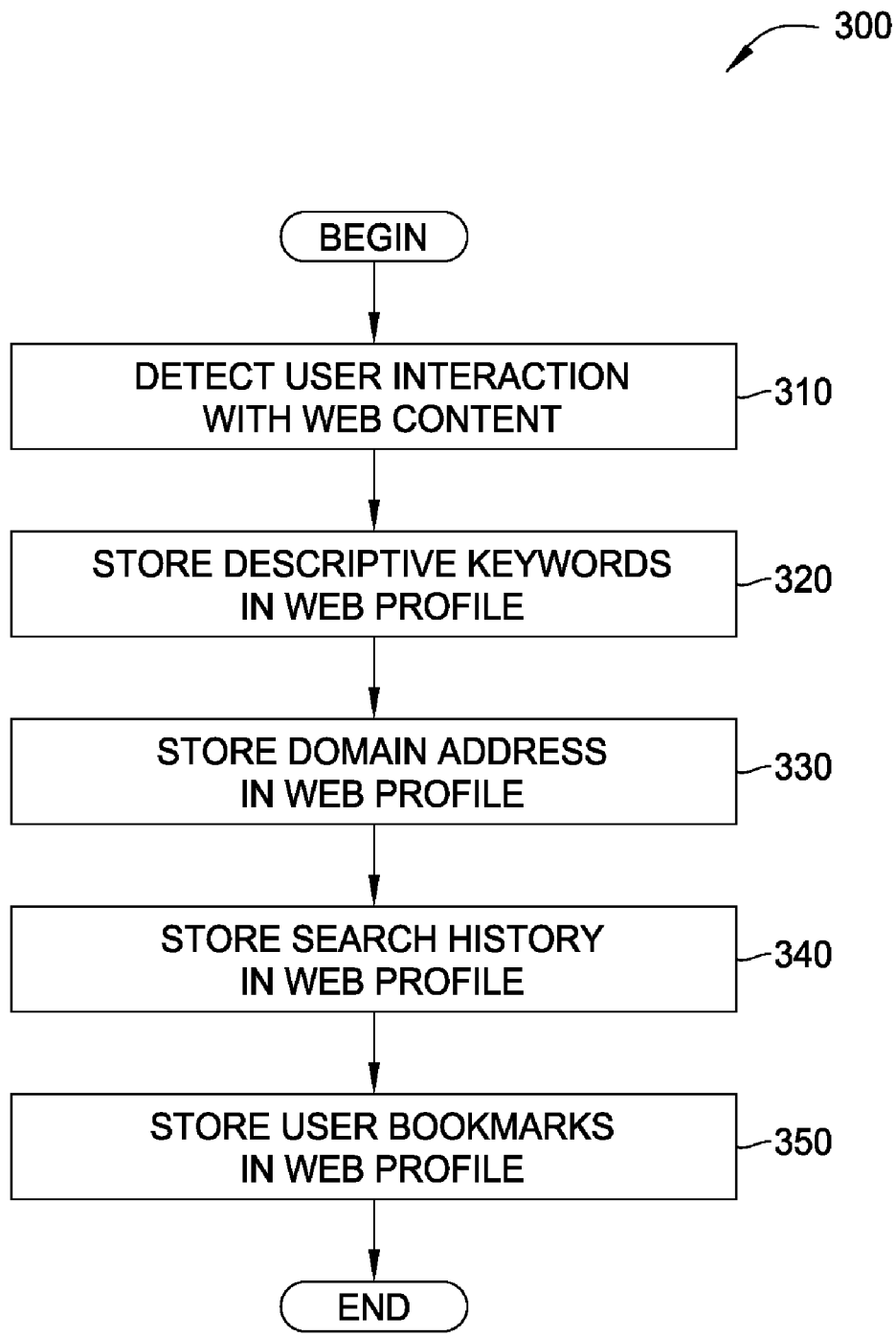
FIG. 3 is a flow diagram illustrating a method for generating a web profile describing user interactions in a browser application, according to one embodiment of the invention.

FIG. 3 is a flow diagram illustrating a method 300 for generating a web profile describing user interactions in a browser application, according to one embodiment of the invention. Persons skilled in the art will understand that, even though the method is described in conjunction with the systems of FIGS. 1-2, any system configured to perform the steps of method 300, in any order, is within the scope of the present invention.

The method 300 begins at step 310, where a browser application detects a user interaction with web content. For example, browser application 119 (shown in FIG. 1) may detect a user clicking on a hyperlink included in a web page displayed within the browser application 119. Optionally, detecting the user interaction may be triggered by a manual user command. For example, the user may click on a command button included in a toolbar of browser application 119, thus configuring a plug-in included in browser application 119 to detect any subsequent user interaction within a displayed web page.

At step 320, any descriptive keywords associated to the web content may be stored in a web profile (e.g., web profile 116 shown in FIG. 1). The web profile may be a data structure configured to describe characteristics of the user's past interactions with web content. The web content may relate to objects of interest to the user. As used herein, the term "object of interest" may refer to a product, a service, a topic of discussion, and the like. For example, assume the user of browser application 119 is interacting with a web page describing various portable music players. In this case, the web page may include the keywords "music," "player," "portable," "MP3" and the like. Such keywords describe the content of web page, and may be stored in web profile 116. Web profile 116 may be used to draw inferences as to virtual objects 132 that the user may be interested in while interacting with virtual world 130 (shown in FIG. 1). This use of web profile 116 is described below with reference to FIG. 4.

At step 330, a domain address for the web content may be stored in the web profile. For example, a uniform resource locater (URL) address of the web page describing various portable music players may be stored in web profile 116. At step 340, the user's search history within the browser application 119 may be stored in web profile 116. At step 350, any bookmarks (i.e., saved domain addresses for specific network locations) created by the user within browser application 119 may be stored in web profile 116. Steps 340 and 350 may be performed in response to an event, such as the user interacting with web content, the user performing a search within the browser application, or the user adding a bookmark within the browser application. Alternatively, steps 340 and 350 may be stored in the web profile based to a predetermined schedule, when the web profile is to be used, or on any other suitable basis. After step 350, the method 300 terminates. Of course, method 300 is provided for illustrative purposes only, and is not limiting of the invention. It is contemplated that the steps of method 300 may be modified to incorporate other data describing user interactions into web profile 116. Such modifications may be made to suit particular situations, and are thus contemplated to be in the scope of the invention.

Figure 4:
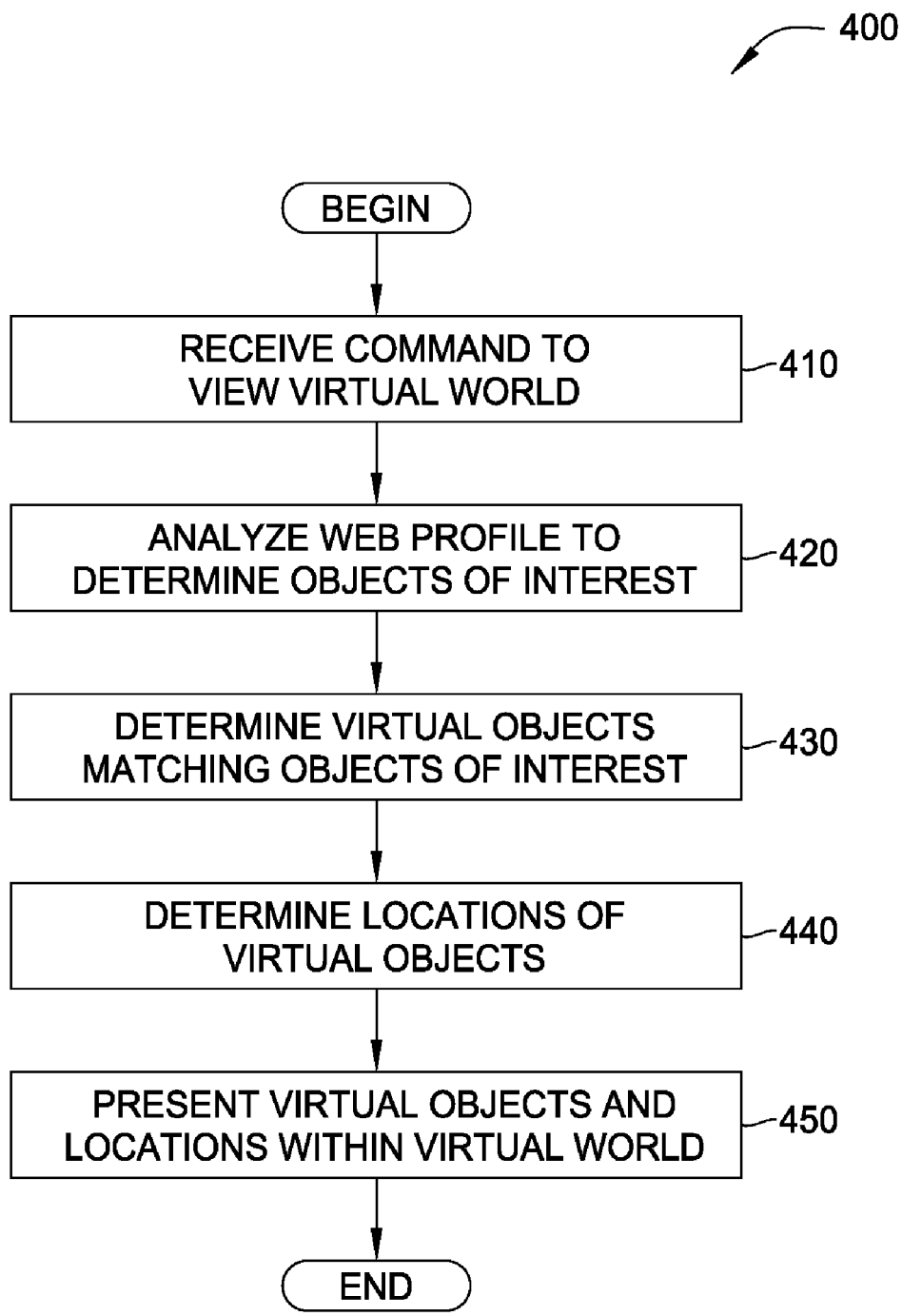
FIG. 4 is a flow diagram illustrating a method for presenting virtual objects of interest to a user based on a web profile, according to one embodiment of the invention.

FIG. 4 is a flow diagram illustrating a method 400 for presenting virtual objects of interest to a user based on a web profile, according to one embodiment of the invention. Persons skilled in the art will understand that, even though the method is described in conjunction with the systems of FIGS. 1-2, any system configured to perform the steps of method 400, in any order, is within the scope of the present invention.

The method 400 begins at step 410 by receiving a user command to view a virtual world. For example, a user may issue a command to start the client application 109 in order to view the virtual world 130. Optionally, the user may issue the command to view the virtual world 130 within the browser application 119. For example, the user may click on a command button included in a toolbar of browser application 119 in order to bring up the client application 109. At step 420, a web profile corresponding to the user may be analyzed to determine objects of interest to the user. For example, client application 109 may be configured to analyze data stored in web profile 116 (e.g., keywords, domain addresses, bookmarks, searches, etc.) in order to determine objects that interested the user while using browser application 119. Optionally, objects of interest may be determined by evaluating whether the user's interest exceeds a predefined level of interest (e.g., the user viewed at least two web sites related to a given object in the user's last web browsing session, the user viewed five web pages related to the object, the user performed three web searches related to the object, the user clicked on two hyperlinks related to the object, etc.). In one embodiment, the web profile may have been generated using method 300 (described above with reference to FIG. 3).

At step 430, the client application may determine any objects included in the virtual world that match the objects of interest. For example, client application 109 may be configured to determine any virtual objects 132 included in virtual world 130 that match the objects described by web profile 116. For example, if web profile 116 includes historical data indicating that the user is interested in portable music players, then client application 109 may determine any virtual objects 132 that represent portable music players, or any stores that may sell such items (e.g., virtual store 220 shown in FIG. 2). At step 440, the client application may determine the locations of the determined virtual objects within the virtual world. For example, client application 109 may determine the locations of virtual world 130 that include the virtual objects 132 determined at step 430 (e.g., the coordinates of the virtual store 220 selling portable music players).

At step 450, the virtual objects and their locations ordered may be presented to the user within the virtual world. For example, virtual objects 132 that are determined to be objects of interest may be presented in a user interface of client application 109. Such a user interface may be a simple list of object names, a map indicating object locations, and the like. Optionally, the user may be "transported" directly to the location of a virtual object (e.g., the user appears inside the virtual store 220, and is presented with a virtual portable music player). In one embodiment, virtual objects 132 may be shown with graphical indicators included in the user's view of the virtual world (e.g., user display 200 shown in FIG. 2). Such indicators may be configured to indicate an object interest to the user, and may include arrows, superimposed text or symbols, highlighting, animation, colors or borders applied to the virtual objects 132. After step 450, the method 400 terminates.

Figure 5:
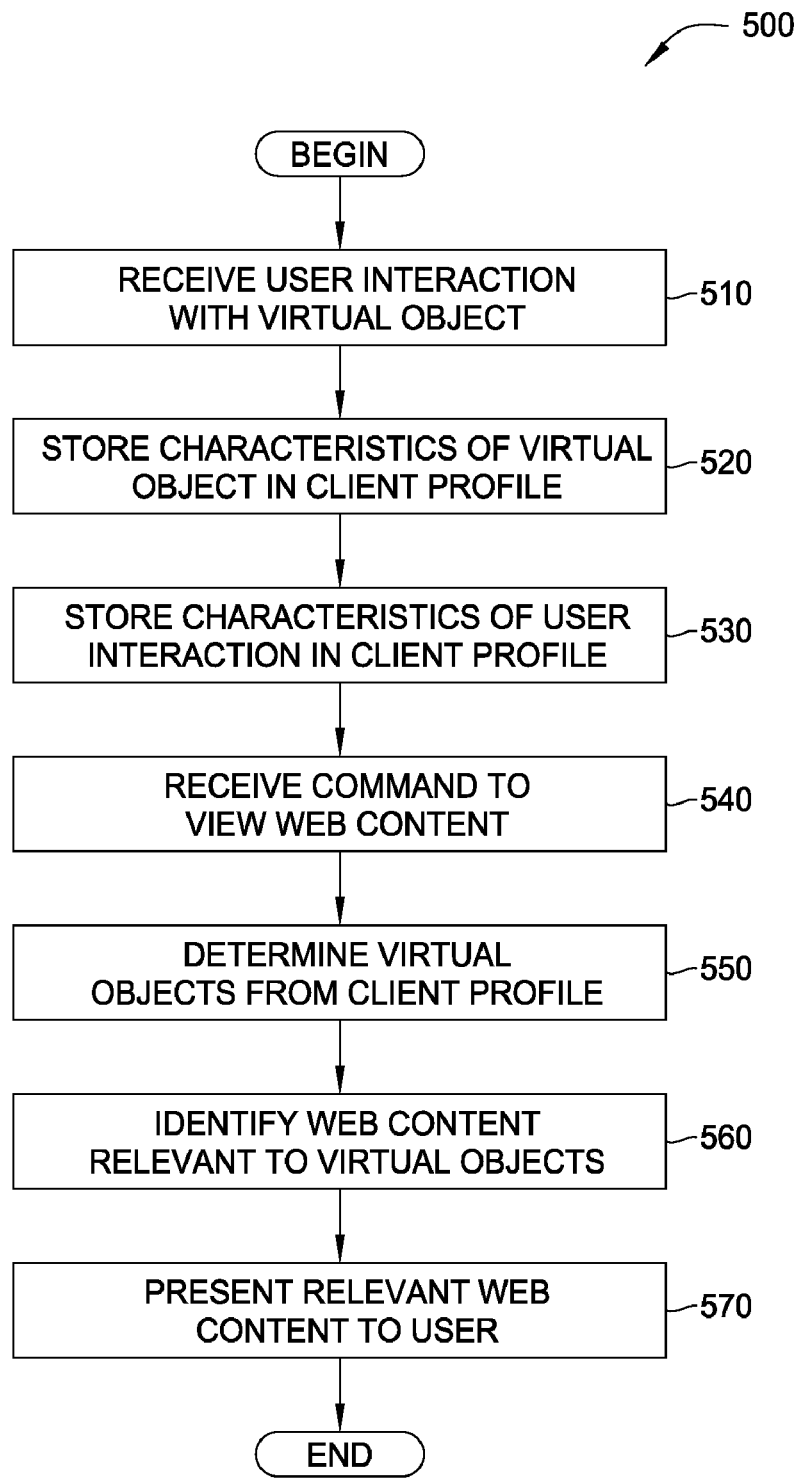
FIG. 5 is a flow diagram illustrating a method for presenting web content of interest to a user based on user interactions within a virtual world, according to one embodiment of the invention.

FIG. 5 is a flow diagram illustrating a method 500 for presenting web content of interest to a user based on user interactions within a virtual world, according to one embodiment of the invention. Persons skilled in the art will understand that, even though the method is described in conjunction with the systems of FIGS. 1-2, any system configured to perform the steps of method 500, in any order, is within the scope of the present invention.

The method 500 begins at step 510, where a browser application detects a user interaction with a virtual object. For example, client application 109 (shown in FIG. 1) may detect a user interacting with a virtual object 132 included in virtual world 130. Such an user interaction may include, e.g., touching an object, picking up an object, looking at an object, walking into a virtual building, operating an object, etc.

At step 520, characteristics of the virtual object may be stored in a client profile (e.g., client profile 106 shown in FIG. 1). At step 530, characteristics of the user's interaction with the virtual object may be stored in the client profile. Generally, the client profile may be a data structure configured to store descriptive characteristics of virtual objects, as well as characteristics of the user's past interactions with the virtual objects while using a client application. For example, assume the user of client application 109 is interacting with a virtual object 132 representing a portable music player. In this case, client application 109 may store data describing the virtual object 132 in client profile 106 (e.g., object owner, location, dimensions, color, type, etc). Such data may be based on descriptive data provided by virtual world 130 (e.g., keywords, metadata, etc.). Further, client application 109 may store data describing the user's interaction with virtual object 132 in client profile 106. Such data may include, e.g., a degree and type of interaction, how long the user interacted with the object, what the user was doing at the time of the interaction, a location of the interaction, etc. Generally, client profile 106 may be used to draw inferences as to web content that the user may be interested in while using browser application 119.

At step 540, a user command to view web content may be received. For example, a user may issue a command to start browser application 119 in order to view web content. Optionally, the user may issue the command to view web content within the client application 109. For example, the user interacting with a virtual object 132 may issue a command within client application 109 in order to view web content related to the virtual object 132. At step 550, a client profile corresponding to the user may be analyzed to determine virtual objects 132 of interest to the user. For example, client application 109 may be configured to analyze data stored in client profile 106 in order to determine virtual objects 132 that the user interacted with while using client application 109. Such data may include descriptions of virtual objects 132 themselves, as well as descriptions of the user's interactions with the objects. Optionally, the virtual objects 132 of interest to the user may be determined by evaluating whether the user's interest exceeds a predefined level of interest (e.g., the user interacted with a given virtual object 132 for at least 10 seconds, etc.).

At step 560, web content relevant to virtual objects 132 of interest to the user may be identified. For example, client application 109 may be configured to identify any web content (e.g., web sites, web pages, discussion boards, blogs, portals, etc.) that may be relevant to virtual objects 132 that the user interacted with included in virtual world 130. In some cases, a virtual object 132 may be considered to be of interest to the user based on the interaction with the virtual object, including the type of interaction, duration of interaction, etc. For example, assume client profile 106 indicates that the user spent a given amount of time interacting with a virtual representation of a particular type of car while using client application 109. In this case, client application 109 may determine that this type of car is of interest to the user, and may thus search for and identify any web content related to this type of car (e.g., web sites of car dealers, web pages including car reviews, etc.).

At step 570, the web content may be presented to the user within a browser application. For example, browser application 119 may present the user with a list of hyperlinks to web content related to virtual objects 132 of interest to the user. Optionally, the user may be presented directly with a web page including relevant content. After step 570, the method 500 terminates.

While the foregoing is directed to embodiments of the present invention, other and further embodiments of the invention may be devised without departing from the basic scope thereof, and the scope thereof is determined by the claims that follow.

What is claimed is:
1. A computer-implemented method, comprising:
   collecting data describing interactions between an avatar and a plurality of virtual objects in a virtual environment;
   characterizing a level of interest of a user in the plurality of virtual objects using the collected data, wherein the user is controlling the avatar through a client application configured to access the virtual environment;

receiving, from the user, a command to view web content, which activates a web browser to view the web content, wherein the web content is from a web environment, wherein the web browser and the web content are different from and external to the virtual environment, wherein the avatar is not in the web environment;

identifying at least one virtual object, of the plurality of virtual objects, in which the user has a level of interest which exceeds a predetermined level of interest;

determining web content included in the web environment that corresponds to the at least one virtual object from the virtual environment identified as exceeding the predetermined level of interest, wherein determining the web content comprises matching a description of the web content to a description of the at least one virtual object; and providing the determined web content for display to the user via a web browser in a browsing session accessing the web environment, responsive to the command received from the user.

2. The computer-implemented method of claim 1, wherein the data describing interactions between an avatar and virtual objects in a virtual environment comprises at least one of: (i) a type of interaction, (ii) a degree of interaction, (iii) a time duration for the interaction, (iv) a location within the virtual environment for the interaction, and (v) the user's other activities during the interaction.

3. The computer-implemented method of claim 1, wherein the interactions comprise at least one of: (i) the avatar viewing one of the virtual objects in a virtual environment, and (ii) the avatar manipulating one of the virtual objects in a virtual environment.

4. The computer-implemented method of claim 3, wherein the web content comprises at least one of: (i) a web site, (ii) a web page, (iii) a discussion board, (iv) a blog, and (v) a portal.

5. A computer program product for determining web content of interest based on interactions with virtual objects the computer program product comprising:

a computer-readable storage medium having computer-readable program code embodied therewith, the computer-readable program code comprising:

computer-readable program code configured to collect data describing interactions between an avatar and a plurality of virtual objects in a virtual environment;

computer-readable program code configured to characterize a level of interest of a user in the plurality of virtual objects using the collected data, wherein the user is controlling the avatar through a client application configured to access the virtual environment;

computer-readable program code configured to receive, from the user, a command to view web content, which activates a web browser to view the web content, wherein the web content is from a web environment, wherein the web browser and the web content are different from and external to the virtual environment, wherein the avatar is not in the web environment;

identifying at least one virtual object, of the plurality of virtual objects, in which the user has a level of interest which exceeds a predetermined level of interest;

computer-readable program code configured to determine web content included in the web environment that corresponds to the at least one virtual object from the virtual environment identified as exceeding the predetermined level of interest, wherein determining the web content comprises matching a description of the web content to a description of the at least one virtual object; and computer-readable program code configured to provide the determined web content for display to the user via a web browser in a browsing session accessing the web environment, responsive to the command received from the user.

6. The computer program product of claim 5, wherein the data describing interactions between an avatar and virtual objects in a virtual environment comprises at least one of: (i) a type of interaction, (ii) a degree of interaction, (iii) a time duration for the interaction, (iv) a location within the virtual environment for the interaction, and (v) the user's other activities during the interaction.

7. The computer program product of claim 6, wherein the interactions comprise at least one of: (i) the avatar viewing one of the virtual objects in a virtual environment, and (ii) the avatar manipulating one of the virtual objects in a virtual environment.

8. The computer program product of claim 7, wherein the web content comprises at least one of: (i) a web site, (ii) a web page, (iii) a discussion board, (iv) a blog, and (v) a portal.

9. A system, comprising:

a processor; and a memory containing a program, which when executed by the processor is configured to perform an operation, the operation comprising:

collecting data describing interactions between an avatar and a plurality of virtual objects in a virtual environment;

characterizing a level of interest of a user in the plurality of virtual objects using the collected data, wherein the user is controlling the avatar through a client application configured to access the virtual environment;

receiving, from the user, a command to view web content, which activates a web browser to view the web content, wherein the web content is from a web environment, wherein the web browser and the web content are different from and external to the virtual environment, wherein the avatar is not in the web environment, identifying at least one virtual object, of the plurality of virtual objects, in which the user has a level of interest which exceeds a predetermined level of interest;

determining web content included in the web environment that corresponds to the at least one virtual objects from the virtual environment identified as exceeding the predetermined level of interest, wherein determining the web content comprises matching a description of the web content to a description of the at least one virtual object; and providing the determined web content for display to the user via a web browser in a browsing session accessing the web environment, responsive to the command received from the user.

10. The system of claim 9, wherein the data describing interactions between an avatar and virtual objects in a virtual environment comprises at least one of: (i) a type of interaction, (ii) a degree of interaction, (iii) a time duration for the interaction, (iv) a location within the virtual environment for the interaction, and (v) the user's other activities during the interaction.

11. The system of claim 9, wherein the interactions comprise at least one of: (i) the avatar viewing one of the virtual objects in a virtual environment, and (ii) the avatar manipulating one of the virtual objects in a virtual environment.

12. The system of claim 11, wherein the web content comprises at least one of: (i) a web site, (ii) a web page, (iii) a discussion board, (iv) a blog, and (v) a portal.

13. The system of claim 12, the operation further comprising:
presenting the plurality of virtual objects to the user based on at least one of: (i) a web browsing history of the user, (ii) a search history of the user, (iii) a description of a web content previously visited by the user, (iv) a bookmark created by the user, and (v) a cookie stored by the web browser.

14. The system of claim 13, the operation further comprising:
generating a web profile of the user, wherein the web profile is configured to store: (i) the web browsing history of the user, (ii) the search history of the user, (iii) the description of a web content previously visited by the user, (iv) the bookmark created by the user, and (v) the cookie stored by the web browser, wherein the plurality of virtual objects are presented based on an analysis of the web profile.

15. The system of claim 14, wherein the determined web content comprises a list of hyperlinks pointing to a respective web content.

16. The computer program product of claim 8, the computer-readable program code further comprising:
presenting the plurality of virtual objects to the user based on at least one of: (i) a web browsing history of the user, (ii) a search history of the user, (iii) a description of a web content previously visited by the user, (iv) a bookmark created by the user, and (v) a cookie stored by the web browser.

17. The computer program product of claim 16, the computer-readable program code further comprising:
generating a web profile of the user, wherein the web profile is configured to store: (i) the web browsing history of the user, (ii) the search history of the user, (iii) the description of a web content previously visited by the user, (iv) the bookmark created by the user, and (v) the cookie stored by the web browser, wherein the plurality of virtual objects are presented based on an analysis of the web profile.

18. The computer program product of claim 17, wherein the determined web content comprises a list of hyperlinks pointing to a respective web content.

19. The computer-implemented method of claim 4, further comprising:
presenting the plurality of virtual objects to the user based on at least one of: (i) a web browsing history of the user, (ii) a search history of the user, (iii) a description of a web content previously visited by the user, (iv) a bookmark created by the user, and (v) a cookie stored by the web browser.

20. The computer-implemented method of claim 19, further comprising:
generating a web profile of the user, wherein the web profile is configured to store: (i) the web browsing history of the user, (ii) the search history of the user, (iii) the description of a web content previously visited by the user, (iv) the bookmark created by the user, and (v) the cookie stored by the web browser, wherein the plurality of virtual objects are presented based on an analysis of the web profile.

21. The computer-implemented method of claim 20, wherein the determined web content comprises a list of hyperlinks pointing to a respective web content.

* * * * *